Aug. 28, 1956 J. MATTERN 2,761,061

BROADBAND BALANCED MIXER

Filed Jan. 25, 1952

Inventor:
John Mattern,
by Rowell S. Mack
His Attorney.

United States Patent Office 2,761,061
Patented Aug. 28, 1956

2,761,061

BROADBAND BALANCED MIXER

John Mattern, Syracuse, N. Y., assignor to General Electric Company, a corporation of New York Application January 25, 1952, Serial No. 268,284

3 Claims. (Cl. 250—20)

Figures 1, 2:
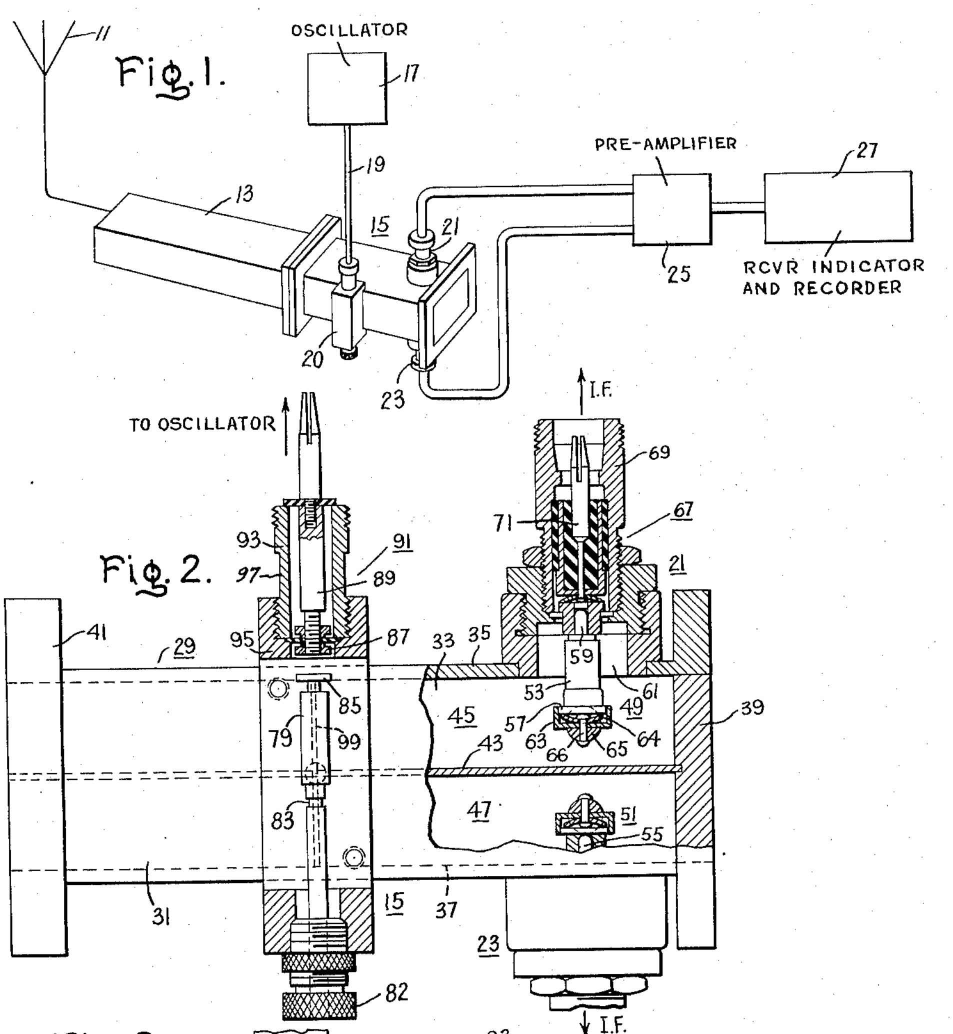

My invention relates to the art including microwave frequency converters or mixers, and more particularly, to balanced mixers of the type commonly employed in microwave superheterodyne circuits or the like.

For most satisfactory operation of such circuits, both the input signal source and the local source of heterodyning oscillations must be matched to the detector circuits and further, the sources must be effectively isolated from each other to prevent unwanted signal interference.

Heretofore balanced mixer apparatus have been described for accomplishing the functions referred to hereinabove, but such apparatus as have been described require excessively complex matching systems necessitating the mounting of the detector circuits exteriorly of the microwave transmission circuits to the respective signal sources. It has been found that such exterior detector-circuit mountings render the mixer subject to damage and also considerably increase the cost of manufacture and maintenance.

Accordingly, it is a principal object of my invention to provide an improved balanced mixer for operation at microwave frequencies.

Another object is to provide an improved microwave mixer wherein the detector circuits are contained within the transmission circuits to the sources of input signals and locally generated heterodyning oscillations.

A further object is to provide a balanced mixer of the type referred to hereinabove and comprising means wholly contained in the transmission circuits to the signal sources to match the detector circuits to the said sources, whereby to improve the broadband operation of the mixer.

Still another object of my invention is to provide a balanced microwave mixer which is both simple in construction and reliable in operation.

Briefly stated, in accordance with one aspect of my invention, the mixer comprises a single wave-guide section that is divided into a pair of wave-propagating wave-guide sections through which equal portions of an input signal are propagated in cophasal relation to respective ones of a pair of matched non-linear devices operatively mounted within the respective wave-guide sections. The non-linear devices are also coupled to receive equal and out-of-phase components of locally-generated heterodyning oscillations to be mixed with the respective input signals to produce balanced intermediate-frequency signals.

A feature of my invention resides in a dual cross-bar transition arrangement, one cross-bar transition in each of the wave-guide sections for efficiently coupling the signals to the detector circuits.

Another feature resides in a dual-loop arrangement for coupling the locally generated signal into the respective wave-guide sections in out-of-phase relation. Broadbanding of the assembled mixer is accomplished by means of an iris in the wave-guide sections and so disposed that one of the iris-defining partitions is provided by the dual-loop structure.

Figure 3:
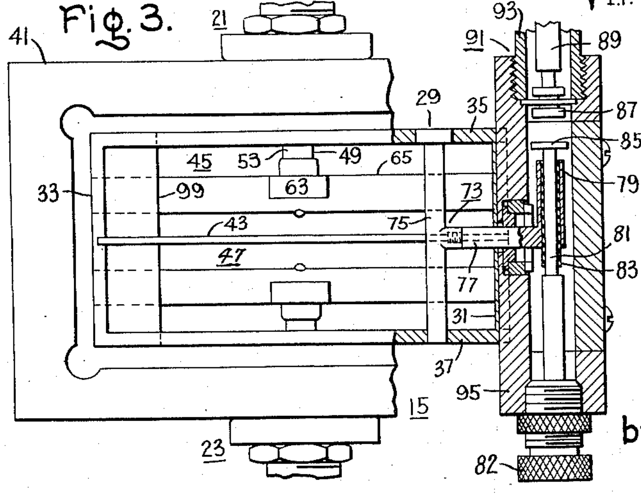
Figure 4:
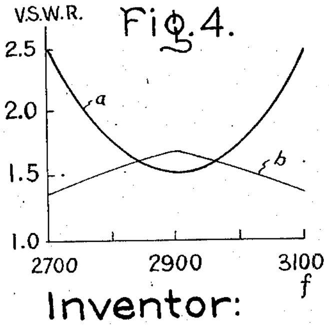

Other objects will become apparent and the invention better understood from a consideration of the following description taken in conjunction with the accompanying drawing in which:

Fig. 1 is a block diagram illustrating the components of a microwave receiver suitably embodying my invention; Fig. 2 is a side elevational view, with parts broken away, of my microwave mixer; Fig. 3 is an end view thereof as seen looking into the left-hand end of Fig. 2; and Fig. 4 is a graph illustrative of an operational characteristic of the invention.

The receiver circuit of Fig. 1 comprises a source of input signals which may be, for example, signals received by an antenna 11 and variable over a band of microwave frequencies, as for example, from 2700 to 3100 megacycles per second.

The signals are fed by means of any suitable transmission line circuit, as for example, a rectangular wave guide 13, to a mixer or frequency converter 15, to which are also fed oscillations from a local oscillator 17, which may be of any conventional type for providing an output having a frequency differing from that of the input signals by a desired difference frequency value. In an operative arrangement, the difference or intermediate-frequency value was approximately 6 megacycles per second, although any other suitable difference frequency may be selected, as desired. The oscillations from the oscillator 17 can be supplied to the mixer 15 by means of a section of coaxial transmission line 19, which is coupled, in a manner subsequently to be described, to an adjustable coupling circuit 20 connected to the mixer apparatus 15.

The input signals and the locally generated oscillations are mixed in the mixer or frequency converter 15 and the converted output signals are derived from a pair of mixer output terminals 21, 23 whence they are applied, through a preamplifier stage 25, to a receiver indicator and recorder apparatus 27 for providing the usual indication and record of the received signals.

The nature and the operation of the broadband balanced mixer may become more apparent from a consideration of the apparatus illustrated in Figs. 2 and 3. The input wave guide 13 and the local oscillator 17 are connected to a section of rectangular wave guide 29 dimensioned to transmit electromagnetic waves of the $TE_{0,1}$ type. The wave guide 29 comprises a pair of side walls 31, 33, top and bottom walls 35, 37 and an end plate 39. The walls 31—37 and the plate 39 are of suitable conducting material such as copper. The input end of the guide 29 is open and is provided with a conventional choke flange coupling 41 for connecting the wave guide 29 to the input guide 13 (Fig. 1).

A conductive septum or partition 43 is centrally supported in the side walls 31, 33 of the guide 29, midway between the top and bottom walls 35, 37, dividing the guide 29 into a pair of parallel guides 45, 47 each having a normal wide transverse dimension and a narrow transverse dimension approximately one half the normal narrow transverse dimension. The septum 43, extends axially from the back plate 39 to a point adjacent the input end of the guide 29. Since the septum 43 is normal to the direction of the electric field of the $TE_{0,1}$ waves entering the guide 29, the input signal is effectively divided into two in-phase components of substantially equal magnitudes. The in-phase components of the input signal are conducted, by means of the respective guides 45, 47 to respective ones of a pair of mixer units 49, 51.

The mixer units 49, 51 may comprise any suitable devices having a non-linear current-voltage characteristic and frequency-conversion properties, such as for example crystals of germanium or silicon. The crystals can be conveniently encased as within cartridges 53, 55, of any suitable conventional type and supported within respective wave guides 45, 47 in energy-coupling relation with the waves therein.

The nature and mounting of only the upper mixer unit 49 will be described, it being understood that the lower unit 51 is similar thereto.

The crystal-enclosing cartridge 53 is provided with a base terminal 57 and an axially aligned stem terminal 59, said terminals being conductively connected in any well-known manner to the opposed surfaces of the crystal (not shown).

As shown, the cartridge 53 is supported in an opening 61 in the top wall 35 of the wave guide for projection into the upper wave guide 45 with the base terminal 57 conductively connected, as by a spring-seat receptacle 63 formed in a transversely extending conductive rod 65. The cartridge-receiving receptacle 63 comprises a cylindrical cup containing a spring member 64 secured to the bottom of the cup as by a rivet 66. The rod 65 is mounted with the ends thereof affixed to the side walls of the guide 45 and centrally disposed between the top wall 35 and the septum 43 and forms an inductive coupling or cross-bar transition between the crystal-mixer unit 49 and the wave energy in the guide 45.

The stem terminal 59, as shown, is adapted for connection to the center conductor of a conventional coaxial connector 67 having an outer conductor 69 and a coaxial inner conductor 71, the connector 67 further comprising conventional radio-frequency choke means to minimize leakage of the wave energy through the connector 67. The details of construction and mode of operation of such coaxial connectors are well-known and further description thereof is, therefore, deemed unnecessary here.

The spacing between the cross-bar transition 65 with respect to the back plate 29 is selected to provide a voltage standing wave ratio which, when plotted against frequency of operation, yields a graph that is symmetrical relative the mid-frequency value of the band. In an operative embodiment in the range of 2700–3100 megacycles per second, a symmetrical graph was obtained, as shown at *a* in Fig. 4. Improved symmetry of the graph can be obtained by adding inductance in series with the crystal, as by increasing the diameter of the opening 61.

The output of the local oscillator 17 is coupled in opposite phases to the upper and lower wave guides 45, 47 by means of a center-fed dual coupling loop arrangement, generally designated by numeral 73 in Fig. 3. The coupling loop 73, as will appear, is connected to the coaxial transmission line 19 (Fig. 1) to the oscillator through an adjustable-capacitance feed for controlling the level of the oscillations supplied to the guides 45, 47.

As shown more clearly in Fig. 3, the coupling loop arrangement 73 comprises a conductive rod 75 extending through an opening in septum 43 and disposed parallel to the electric field of the waves in the guides 45, 47. The rod 75 is spaced from the side wall 31 a predetermined distance according to the desired degrees of coupling and impedance match, as will presently appear. Connected at the mid-point of rod 75 and forming a T therewith is a second conductive rod 77, which at its remote end is formed with a perpendicularly extending tubular member 79 adapted to receive a coaxial rod 81. The rod 77 together with the respective halves of the rod 75 form energy-coupling loops within the guides 45 and 47.

The rod 81 is insulatingly spaced from the tubular member 79 by an insulating sleeve 83, and is adapted to be axially moved with respect to the member 79, as by rotation of a knob 82, so as to vary the spacing between a conductive disk 85, carried at the inner end of the rod 81, and a similar relatively stationary disk 87 threaded or otherwise affixed to the inner end of the inner conductor 89 of a coaxial fitting 91. A tubular section 93, coaxial with the inner conductor 89, forms the outer conductor 93 of the coaxial fitting 91, and is threaded into an opening in a substantially rectangular housing 95, which is axially bored to define, with the rod 81 and inner conductor 89, a section of coaxially transmission line. The other end of the tubular section 93 is threaded to receive the coupling screw of a mating coaxial fitting (not shown) connected to the line 19 (Fig. 1), the intermediate outer wall portion of the section 93 being formed with a constriction, as at 97, to define, with the mating coaxial fitting, a quarter-wave choke.

It will be seen that the oscillations from the oscillator 17 are supplied in out-of-phase relation to the wave guides 45, 47, and at a level determined by the capacitance of the adjustable condenser 85, 87. The oscillations are mixed with the input signals coupled to the mixers 49, 51 to provide the desired intermediate-frequency signals.

For improving the impedance match between the crystals and the associated guides over a broader band of operating frequencies, I provide an inductive iris in the transverse plane including the loops 75, 77 so that the latter, in view of the susceptance introduced thereby, cooperate with a thin conductive septum 99 to define the iris. The width and the location of the iris are fixed at a value that yields an overall voltage-standing-wave ratio characteristic, as shown at *b* in Fig. 4. The septum 99 and the loops 75, 77 are thus positioned at a point one half wavelength back from the input end of the guides 45, 47 since the impedance, as seen looking out of the mixer appears to be an open circuit to the loops 75, 77.

There has thus been described a compact broadband balanced mixer for microwave receivers that obviates the above-noted undesirable features of the prior-known mixers in that the crystal units and matching elements are contained within the wave-guide sections of the mixer unit.

From the foregoing explanation, it will be seen that the provision of cross-bar transitions in the individual wave guides provides broadband matching of the crystals to the guides. Substantial broadbanding is also achieved by the division of the wave guide into a pair of parallel guides each of which presents a lower impedance to the crystal. Further, the splitting of the wave guides, it will be observed, improves the equal division of the local oscillator power between the crystals.

As is well known, reverse feeding of the oscillations from the local oscillator toward the input-signal source is undesirable. In the mixer of this invention, propagation of energy down the wave guide 13 (Fig. 1) is suppressed since the addition of the out-of-phase components at the input end of the guide 29 results in cancellation of the waves which would otherwise propagate into the main wave guide system.

While I have shown and described specific embodiments of my invention, I do not desire my invention to be limited to the particular form shown and described and I intend by the appended claims to cover all modifications within the spirit and scope of my invention.

What I claim as new and desire to secure by Letters Patent of the United States is:

1. A frequency converter comprising a section of wave guide having a conductive partition therein dividing said section into a pair of similar wave guide sections, a first frequency input connection in said sections for launching in said sections substantially equal amounts of wave energy at said first frequency, a coaxial transmission line having coaxially disposed inner and outer conductors coupled at one end to a source of a second frequency, the inner conductor having a T-shaped extension, opposite portions of said T-shaped extension projecting into respective sections for coupling thereinto energy at said second frequency, a pair of non-linear devices, means including conductive rod members in each of said sections and disposed in parallel relation to said conductive partition for supporting said devices in energy-exchanging relation with the waves in the respective sections, said devices being responsive to the combined energies in said sections, and means to derive intermediate-frequency signals from said devices.

2. Ultra high frequency apparatus for mixing signals comprising a pair of signal sources each adapted to provide relatively high-frequency signals of slightly different frequency values, wave transmission means adapted to propagate waves of both said frequency values and coupled to one of said sources, means to divide the signal from said one source into two substantially equal parts, second wave transmission means coupled to the other of said sources and including means to couple the signal therefrom in co-phasal relation to one said part and in phase opposition to the other said part, said second transmission means further including adjustable reactance means for controlling the level of the signal coupled from said other source, mixing means in energy coupling relation with each said part and adapted to mix the signal from said sources to provide a resultant signal having a frequency value that is very small compared to the frequency values of either of said sources, each of said mixing means being conductively coupled to a pair of oppositely disposed walls of said wave transmission means, said conductive coupling being in configuration substantially parallel to said means to divide the signal from one source into two substantially equal parts, coaxial-line output means for translating said resultant signal, and means within said wave transmission means for increasing the bandwidth of said mixing means and said transmission means comprising an inductive iris in said wave transmission means including said signal-coupling means.

3. Ultra high frequency apparatus for mixing signals comprising a pair of signal sources each adapted to provide relatively high-frequency signals of slightly different frequency values, wave transmission means adapted to propagate waves of both said frequency values and coupled to one of said sources, means to divide the signal from said one source into two substantially equal parts, second wave transmission means coupled to the other of said sources and including means disposed in a transverse plane of said wave transmission means to couple the signal therefrom in co-phasal relation to one said part and in phase opposition to the other said part, said second transmission means further including adjustable reactance means for controlling the level of the signal coupled from said other source, mixing means in energy coupling relation with each said part and adapted to mix the signal from said sources to provide a resultant signal having a frequency value that is very small compared to the frequency values of either of said sources, each of said mixing means being conductively coupled to a pair of oppositely disposed walls of said wave transmission means, coaxial-line output means for translating said resultant signal and a transverse septum disposed coplanarly with said signal coupling means within said wave transmission means forming in conjunction with said signal coupling means an inductive iris increasing the band width of said mixing means and said transmission means.

References Cited in the file of this patent

UNITED STATES PATENTS

| | | |
|---|---|---|
| 2,455,657 | Cork et al. | Dec. 7, 1948 |
| 2,476,885 | McClellan | July 19, 1949 |
| 2,514,678 | Southworth | July 11, 1950 |
| 2,527,910 | Braden | Oct. 31, 1950 |
| 2,576,481 | Rodwin | Nov. 27, 1951 |

OTHER REFERENCES

"Microwave Converters" by C. F. Edwards, Bell Telephone System Technical Publications, Monograph B–1495, Proc. I. R. E., vol. 35, pages 1181–1191, November 1947.